(12) United States Patent
Eastlund et al.

(10) Patent No.: US 8,364,647 B1
(45) Date of Patent: Jan. 29, 2013

(54) SYSTEMS AND METHODS FOR DETECTING TRENDS IN CLUSTERED BUSINESS LISTINGS

(75) Inventors: Paul Eastlund, Mamaroneck, NY (US); Alex Lorbeer, Hoboken, NJ (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/079,354

(22) Filed: Apr. 4, 2011

(51) Int. Cl.
*G06F 7/00* (2006.01)

(52) U.S. Cl. ........................................................ 707/666

(58) Field of Classification Search .................. 707/615, 707/666
See application file for complete search history.

*Primary Examiner* — Truong Vo
(74) *Attorney, Agent, or Firm* — Lerner, David, Littenberg, Krumholz & Mentlik, LLP

(57) ABSTRACT

Systems and methods are provided that detect trends in clustered business listings. The last update time of a last attribute value of a business listing is determined. It is further determined whether a number of data providers supplying the last attribute value has decreased by at least a first predetermined percentage since the last date the last attribute value changed. Moreover, it is determined whether the number of data providers that have stopped supplying the last attribute value since the last date the attribute value changed is greater than the number of data providers that have begun supplying the last attribute value after the last date the last attribute value changed.

16 Claims, 6 Drawing Sheets

SYSTEMS AND METHODS FOR DETECTING TRENDS IN CLUSTERED BUSINESS LISTINGS

BACKGROUND OF THE INVENTION

Systems that provide search and advertising services allow users to search for business listings associated with a geographic location or area. For example, a user may enter search terms for a business type that result in a plurality of business listings. Such systems typically gather business listing data from various online directories and aggregators such as infousa, acxiom, amacai, etc. Each listing may include various types of information such as addresses and phone numbers.

Unfortunately, maintaining consistent attributes throughout the listings is challenging when the data is collected from diverse sources. For example, the data sources may provide different addresses or phone numbers for the same business entity. Thus, a restaurant listing of a first source may have an address of "W 44$^{th}$ St," a restaurant listing of a second source may have an address of "260 W 44$^{th}$ St," and a restaurant listing of a third source may have an address of "E 44$^{th}$ St." Examining the business data manually would be inefficient in view of the amount of listings typically maintained by these systems. Users searching for particular businesses are thus required to tolerate business listings that may be inaccurate or out of date.

BRIEF SUMMARY OF THE INVENTION

Aspects of the invention provide systems and methods that identify trends in business listing attributes from a first value to a second value and that prioritize the attribute for manual inspection if a trend is detected.

In one aspect, a method for detecting trends in clustered business listings may comprise determining a last date that a last attribute value of a business listing has changed, determining whether a number of data providers supplying the last attribute value has decreased by at least a first predetermined percentage since the last date the last attribute value changed, determining using a processor whether a number of data providers that have stopped supplying the last attribute value since the last date the attribute value changed is greater than a number of data providers that have begun supplying the last attribute value after the last date the last attribute value changed, determining whether a number of data providers supplying a new attribute value exceeds a second predetermined percentage since the last date the last attribute value changed, and determining whether a third predetermined percentage of the number of data providers that have stopped supplying the last attribute value since the last date the attribute value changed have begun supplying the new attribute value since the last date the last attribute value has changed.

In a further aspect of the invention, the new attribute value may be of a same type as the last attribute value.

In another aspect of the invention, the method may further comprise rendering on an electronic display an indication that the last attribute value is trending toward the new attribute value.

Furthermore, the first predetermined percentage may be approximately twenty five percent, the second predetermined percentage may be approximately ten percent, and the third predetermined percentage may be approximately fifty percent.

In another aspect of the invention, a sum of data providers supplying the leading attribute value may be greater than a sum of data providers supplying any other attribute value of a same type. Alternatively, a weighted sum of data providers supplying the leading attribute value may be greater than a weighted sum of data providers supplying any other attribute value of a same type.

In yet a further aspect of the invention, a system for detecting trends in clustered business listings is provided. The system may comprise a processor, a listings manager module containing instructions to be executed by the processor, a display device for displaying data processed by the processor in accordance with the instructions of the listings manager module, and a memory for storing data accessed by the processor. The listings manager module may instruct the processor to determine a last date that a last attribute value of a business listing has changed, to determine whether a number of data providers supplying the last attribute value has decreased by at least a first predetermined percentage since the last date the last attribute value changed, to determine whether a number of data providers that have stopped supplying the last attribute value since the last date the last attribute value changed is greater than a number of data providers that have begun supplying the last attribute value after the last date the attribute value changed, to determine whether a number of data providers supplying a new attribute value exceeds a second predetermined percentage since the last date the last attribute value changed, and to determine whether a third predetermined percentage of the number of data providers that have stopped supplying the last attribute value since the last date the attribute value changed have begun supplying the new attribute value since the last date the last attribute value has changed.

DETAILED DESCRIPTION

Systems and methods are provided that identify and analyze business listing attributes (e.g., address, phone number, etc.) trending toward a particular value. In one aspect, the attributes of a business listing having multiple entries may be normalized (i.e., making the title lower-case, adding area code to phone number, dropping suite number from address etc.) For each attribute value, the last date of change of the leading attribute value or last value may be determined. The leading attribute value may be compared and contrasted to other values provided to determine whether an attribute for a business listing is trending toward a new value. If a trend is detected, an alert may be rendered that warns of the trend and that suggests replacing the current attribute value with the value toward which a trend was identified.

Figure 1:
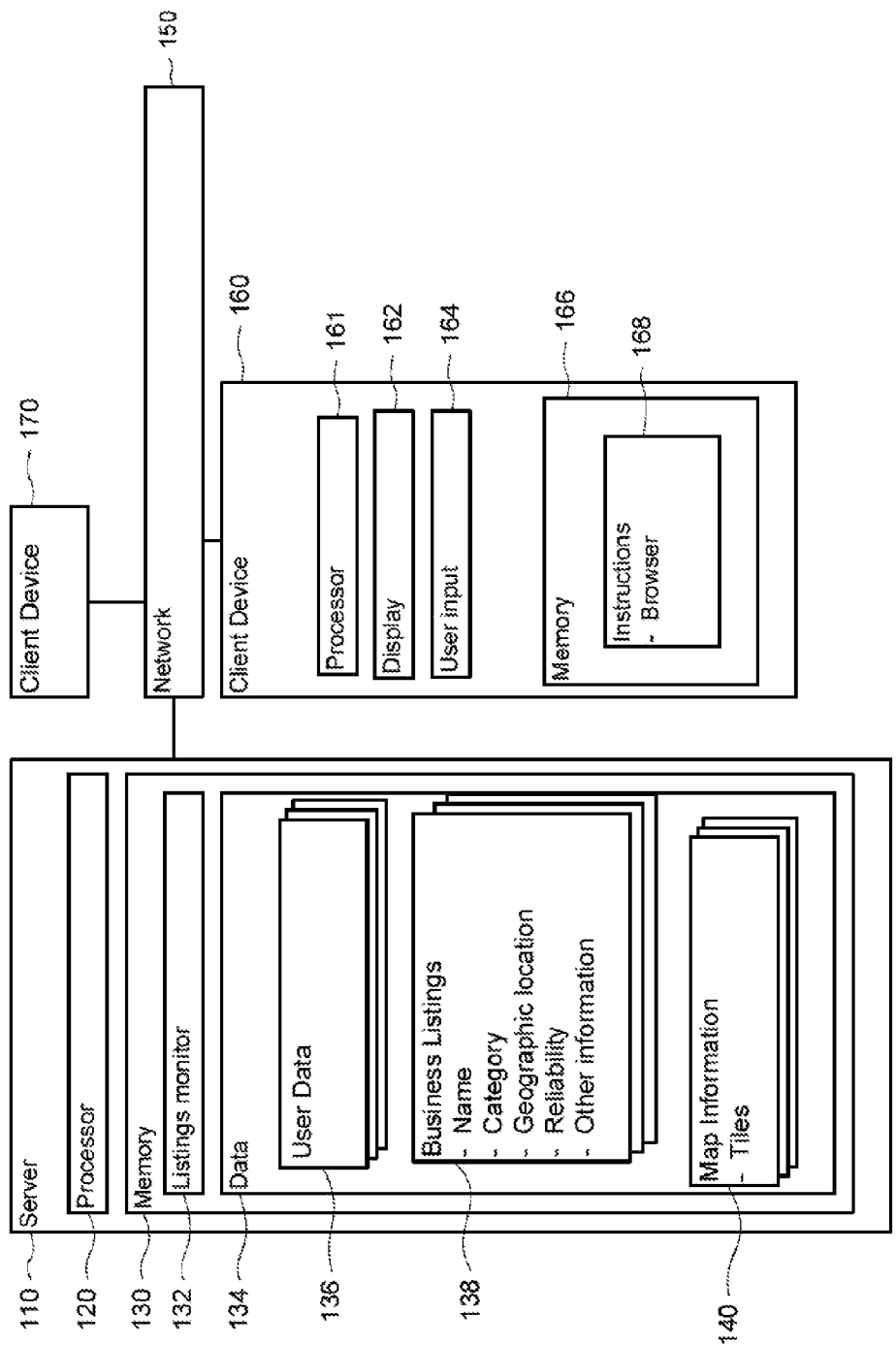
FIG. 1 is a functional diagram of a system in accordance with an aspect of the invention.
Figure 2:
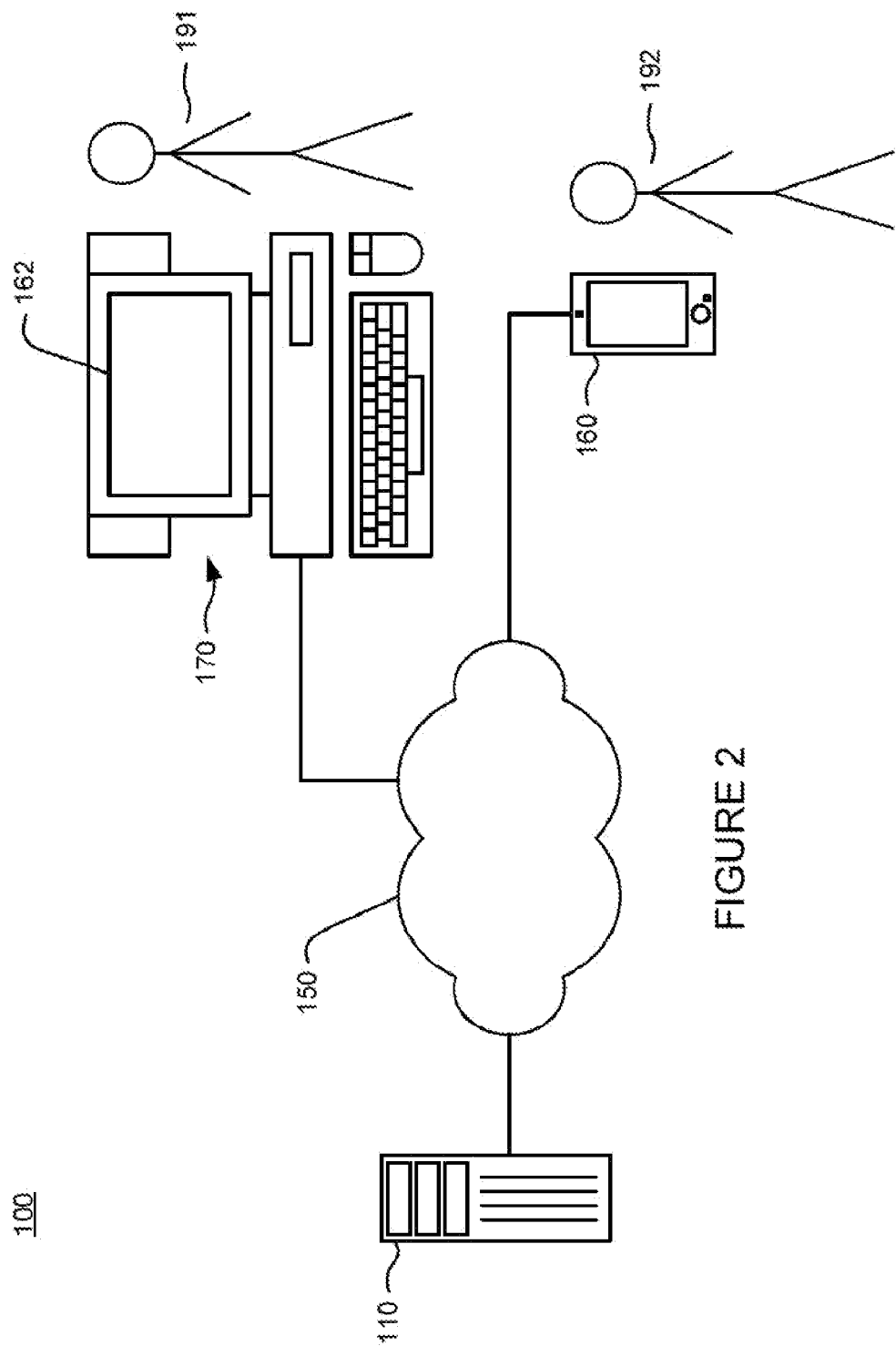
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.'

The memory 130 stores information accessible by processor 120, including listings monitor module 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems may include different combinations of the foregoing, whereby different portions of the instructions and data are stored on different types of media.

The listings monitor module 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions of listings monitor module 132. For instance, although the systems and methods are not limited by any particular data structure, the data may be stored in computer registers, in a relational database as a table having a plurality of different fields and records, XML documents, etc.

By further way of example only, image data, such as map information tiles 140, may be stored as bitmaps comprised of grids of pixels that are stored in accordance with formats that are compressed or uncompressed, lossless or lossy, and bit-map or vector-based, as well as computer instructions for drawing graphics.

The processor 120 may be any conventional processor, such as processors from Intel Corporation or Advanced Micro Devices. Alternatively, the processor may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory 130 may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may be capable of communicating with client devices 160 and 170 via network 150 such that computer 110 uses network 150 to transmit and display information to a user 191 on display 162 of client device 170. Computer 110 may also comprise a plurality of computers that exchange information with different nodes of a network for the purpose of receiving, processing and transmitting data to the client devices. In this instance, the client devices will typically still be at different nodes of the network than any of the computers comprising computer 110.

Network 150, and intervening nodes between computer 110 and the client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the computer 110, with a processor, memory and instructions. Each client device 160 or 170 may be a personal computer intended for use by a person 191-192, and have all of the components normally used in connection with a personal computer such as a processor 161, memory 166 (e.g., RAM and internal hard drives) storing data and instructions 168, an electronic display 162 (e.g., a monitor having a screen, a small LCD touch-screen, a projector, a television, a computer printer or any other electrical device that is operable to display information), user input 164 (e.g., a mouse, keyboard, touch-screen or microphone), speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry type phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

In an alternate embodiment, computer 110 may be a stand alone system without a persistent connection to a network. In that regard, computer 110 may process the business listings database 138 and display the alert on a user display that is directly linked to computer 110.'

Returning to FIG. 1, user data 136 identifies users of the system, i.e., any entity that interacts with the system such as business owners or administrators. For example, one user may be a database administrator with fully authorized access to the computer 110.'

The computer 110 may also contain business listings database 138 identifying local businesses, clubs, or other objects or features associated with particular geographic locations. For example, an entity may be associated with a name (such as a company's name), a category (such as "pizza", "Italian restaurant" or "ballpark"), a geographic location (such as "123 Main Street" or latitude and longitude), and various other types of information.

Entity information may be compiled by automatically gathering information from multiple online directories, aggregators, telephone directories or other content sources.'

Entities may also refer to other geographically-located objects in addition to or instead of businesses. For example, entities may include points of interest ("POI"), individual's homes, landmarks, roads, etc. Therefore, while many of the examples below refer to businesses, most aspects of the invention are not limited to any particular type of entity unless stated otherwise.

Returning to FIG. 1, computer 110 may provide map information tiles 140 coinciding with each business listing. For example, the business listings may also be associated with a geographic location on a map. Computer 110 may identify an appropriate map tile from the map information tiles 140, based on the listing and an approximate map location of the listing.

Aspects of the invention may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that are capable of identifying geographic locations (e.g., lot and block numbers on survey maps). Moreover, a location may define a range of the foregoing. In one example, locations may be further translated from one reference system to another. For instance, the computer 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other reference systems as well.'

A user may access computer 110 and identify itself as the owner of an entity such as a business. For example, an entity user may be the owner of a restaurant named "Joe's Pizza." The entity user operating a client device, such as client device 160, may provide computer 110 with a name, address, phone number, or other information associated with the entity. The owner of the entity may only be authorized to update the business listing belonging to the owner.

Computer 110 may use information received from the client device to identify and update a listing associated with the entity. For example, if the server receives information such as, "Tony's Pizza" and phone number "(555) 321-6780," computer 110 may identify the entity user, client device, or the entity associated with the entity user with the listing "Tony's Pizza, 25 Fourth Street, (555) 321-6789." Computer 110 may also associate other information, for example additional information received from the entity user, with the listing.

Figure 3:
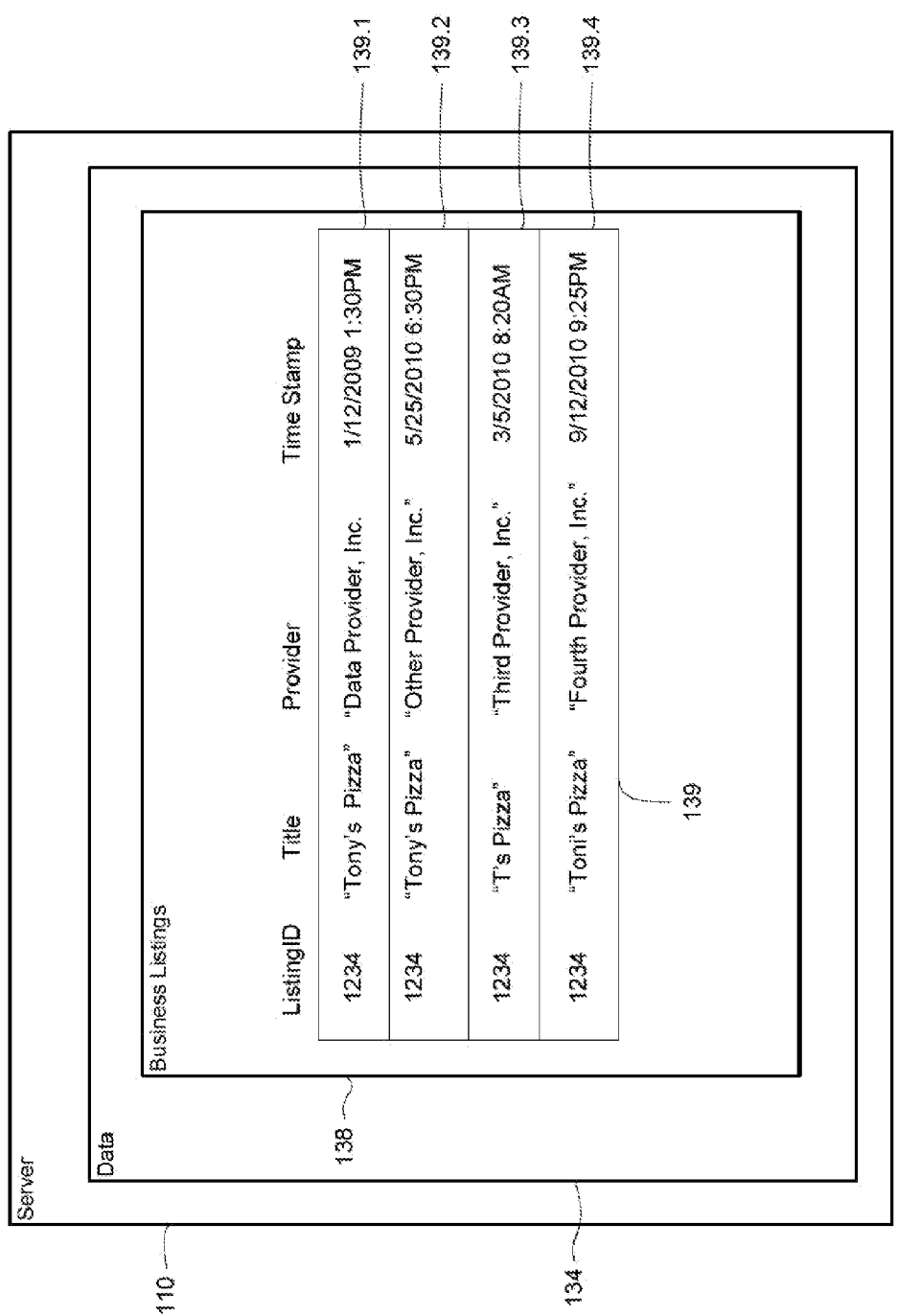
FIG. 3 is a functional diagram of information in accordance with an aspect of the invention.

FIG. 3 shows an illustrative set of records 139.1-139.4 stored in a Title table 139, which may be established within the business listings database 138. Each record is shown having a column for a listing identification number derived by the system, a column for a title, a column for a data provider, and a timestamp column. Title table 139 may be any conventional relational database table (i.e., Oracle, Sybase, etc.) Title table 139 may maintain the Titles for all business listings. In FIG. 3, different titles for a pizzeria restaurant are illustrated. The listing identification number is shown as 1234. The title of record 139.1-139.2 is shown as "Tony's Pizza," the title of record 139.3 is shown as "T's Pizza," and the title of record 139.4 is shown as "Toni's Pizza." The provider column shows the data sources supplying each title. The timestamp column represents the last date the record was modified.

Figure 4:
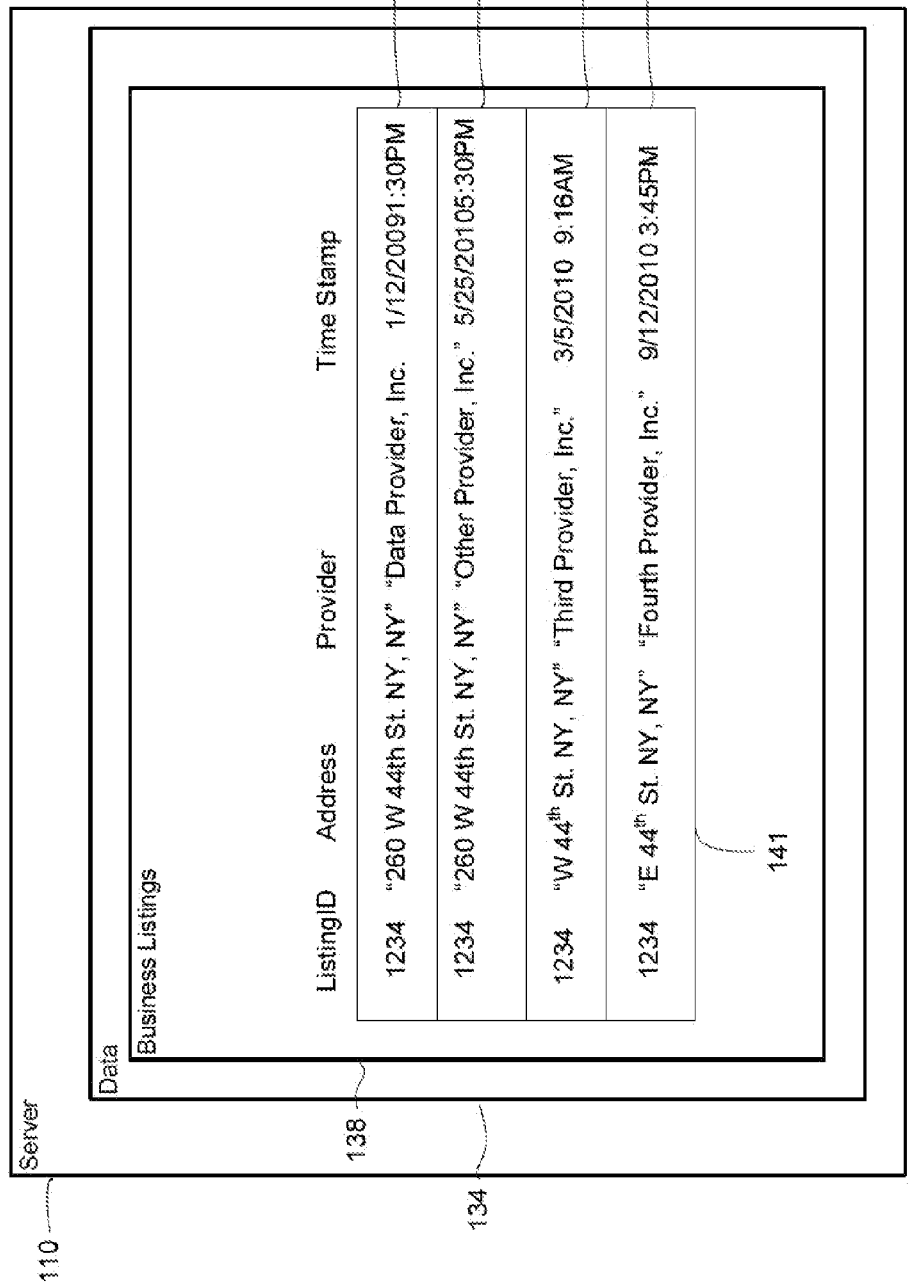
FIG. 4 is a functional diagram of information in accordance with an aspect of the invention.

FIG. 4 shows another illustrative set of records 141.1-141.4 stored in an address table 141, which may also be established within the business listings database 138. As with the title table 139, address table 141 has a column for a listing identification number, a column for a data provider, and a timestamp column. In contrast, address table 141 has an address column. The records shown in address table 141 also have a business listing identifier of 1234. Records 141.1-141.2 are shown with an address of "260 W $44^{th}$ St. NY, N.Y.," record 141.3 is shown with an address of "W $44^{th}$ St. NY, N.Y.," and record 141.4 is shown with an address of "E $44^{th}$ St. NY, N.Y."

Each attribute and their respective providers may be maintained in a different table. For example, there may also be a telephone number table that maintains the telephone numbers of the listings. There may also be a latitude/longitude table that maintains the current latitude and longitude coordinates of the listing. Any type of attribute may be maintained in a table accompanied by a column for a business listing identification number, a data provider column, a timestamp column, or any other relevant data column. Alternatively, all attributes may be maintained in one master table. It is understood that different data models may be utilized. The records may be represented in listings monitor module 132 as the following:

Listing {
'ID: 1234
'Titles {
''TitlesandProviders {
'''Title: "Tony's Pizza"
   'Provider: "Data Provider, Inc."
   'Provider: "Other Provider, Inc."
''''}
    TitlesandProviders {
''''Title: "T's Pizza"
   'Provider: "Third Provider, Inc."
''''}
'''TitlesandProviders {
''''Title: "Toni's Pizza"
   'Provider: "Fourth Provider, Inc."
''''}
'''}
'Addresses {
''''AddressandProviders {
''''Address: "100 Main Street, NY, N.Y."
   'Provider: "Data Provider, Inc."
   'Provider: "Other Provider, Inc."
   }
   . . . ''''
"

The illustrative data structure above may be implemented in listings monitor module 132 for each listing. The tables for each attribute may maintain attribute values for a predetermined time (i.e., a week, a month, etc.).

Listings monitor module 132 may use different frameworks for processing the data when the amount of data is very large. For example, U.S. Pat. No. 7,650,331 to Dean, et al. ("MapReduce") discloses a system and method for efficient large scale data and is incorporated by reference herein. Listings monitor module 132 may apply the MapReduce framework to the listings data every week, month, etc. The data processed by the framework may represent six months worth of data, a year worth of data, etc. The attribute data may be grouped by listing identification number as shown in the pseudo code above.

One way to process a large amount of listing data is to scan the listing data and allocate a new data set. The new dataset may be indexed by listing ID such that each listing ID references a value type, the old value, and the new value. The data selected for insertion into this new dataset will preferably be data that demonstrates a trend from the old value to the new value based on the analyses disclosed further below. A second pass may be required to ensure that a trend is not being repeated.

Figure 5:
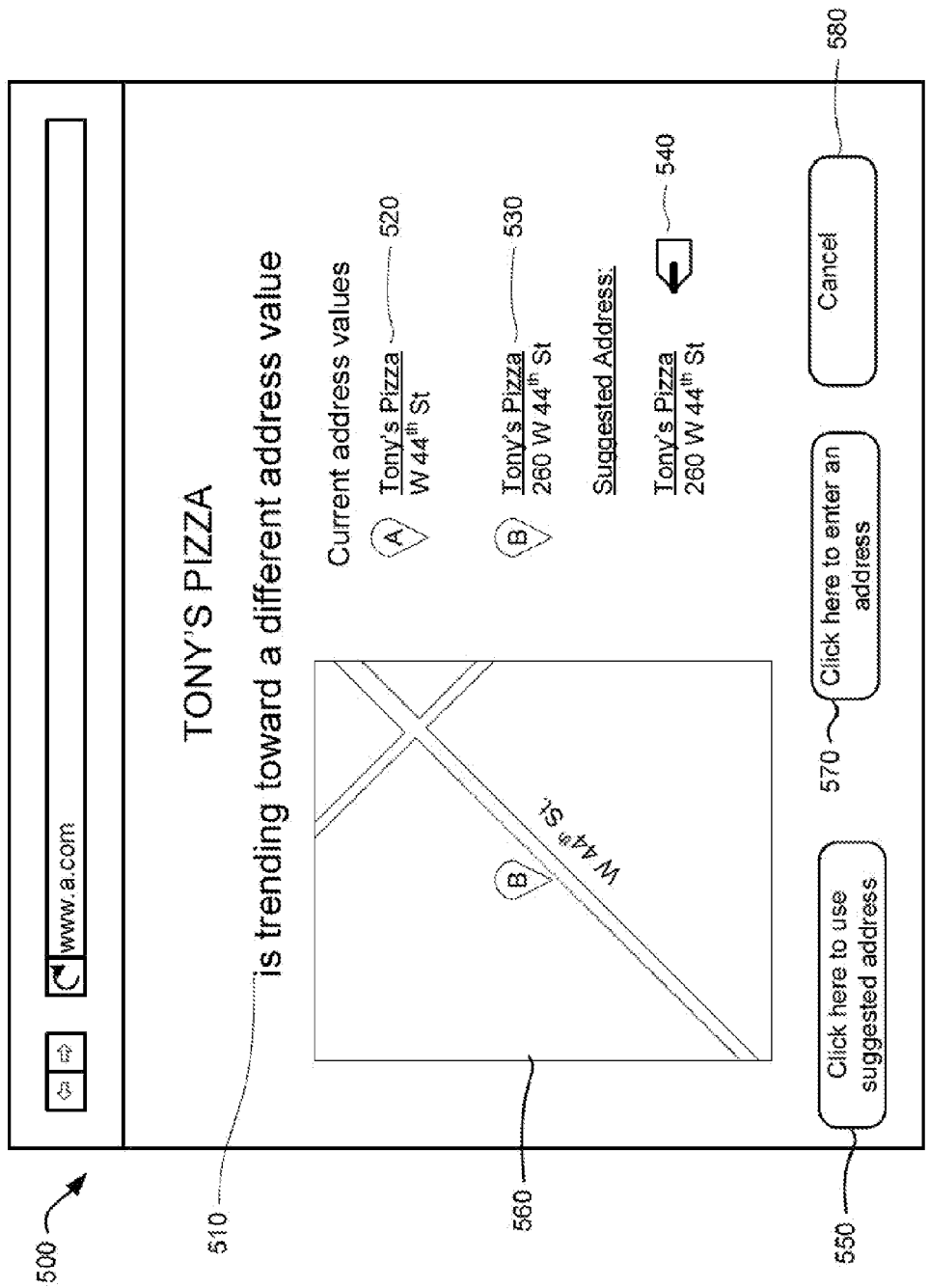
FIG. 5 is an exemplary screen shot in accordance with an aspect of the invention.

FIG. 5 shows an illustrative listing screen display 500 rendered on display 162 via web browser 168 containing a warning message 510. The illustrative display also shows two different attribute values 520 and 530 and a suggested value 540. Map display area 560 shows a rendered map of the suggested address for the listing. The listing screen display 500 may have a confirm button 550 that allows the administrator to update the address to the suggested address. Alternatively, an administrator can set the address to a different address by pressing button 570. The administrator may also decide to make no change to the address by pressing the cancel button 580.'

In addition to the operations illustrated in the previous figures, various operations in accordance with aspects of the invention will now be described. It should be understood that the operations described herein do not need to be performed in the precise order listed. Rather, various operations can be handled in a different order or simultaneously.

Figure 6:
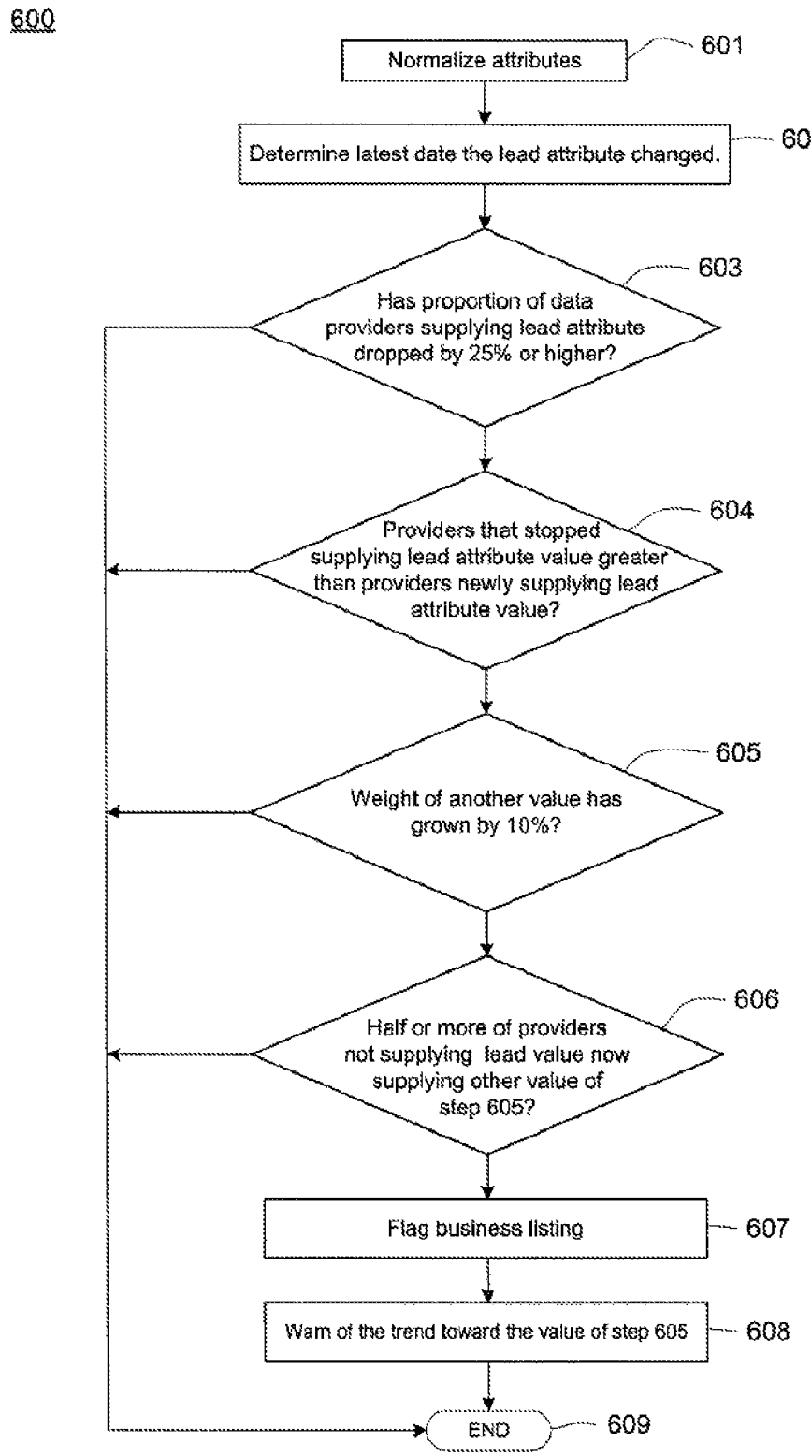
FIG. 6 is a flow chart in accordance with aspects of the invention.

FIG. 6 shows an exemplary method 600 that may be executed by listings monitor module 132 in conjunction with processor 120. Method 600 may be applied to each attribute table (i.e., title, address, phone number, latitude/longitude, etc.) First, in block 601, listings monitor module 132 may normalize the attributes. Normalizing the attributes may include, for example, turning the letters of the title into lower case letters and removing punctuation. An example of normalizing an address may include formatting the address to street-address-level precision (i.e., dropping suite #, etc.). An example of normalizing the phone number may include reducing the phone number to a set of numbers only, adding area codes, country codes, or removing extensions. An example of normalizing latitude and longitude may include dropping precision to thousandths of a degree.

Next, in block 602 listings monitor module 132 may determine the latest date the lead attribute value changed. The lead attribute value may be the value with the highest number of providers. For example, in title table 139 of FIG. 3, "Tony's Pizza" would be the last leading attribute value for the title, since it has more providers than the other two values. In another aspect, the weight may be determined as a weighted sum such that suppliers considered more trustworthy are given more weight.

Then, in block 603, listings monitor module 132 may determine whether the weight of the lead attribute value has dropped by approximately twenty five percent or higher since the last date of change. If the weight of the lead attribute value has dropped by approximately twenty five percent or higher since the last recorded update of the lead attribute value, listings monitor module 132 may advance to block 604 to determine whether more total providers have stopped supplying the lead attribute value than have begun supplying the lead attribute value. This step excludes cases where two listings merge. In block 605, listings monitor module 132 may determine whether the weight of another attribute value of the same type (i.e., title, address, phone number, etc.) has grown by approximately ten percent of the total weight. If the weight of another attribute value has grown by approximately ten percent of the total weight, listings monitor module 132 may advance to block 606 to determine whether at least half of the providers that no longer supply the leading attribute value are now supplying the attribute value that has grown by ten percent of the total weight. If all the conditions of blocks 603-606 are satisfied, listings monitor module 132 may flag the particular business entry in order to prioritize the entry for further inspection in block 607. This may include a subsequent manual inspection. Any conventional flagging method may be employed (e.g., configuration file, registry, Boolean field, etc.). Next, listings monitor module 132 may display or otherwise provide a warning of the trend and display the particular value toward which a trend was identified as a suggested value for the attribute, as shown in block 608. The warning may be rendered via a web browser on a client device or on the server, but it is understood that an independent application may also be utilized. In block 609, listings monitor module 132 terminates. The warning brings the business listing to the attention of a user or administrator who may subsequently update the attribute to the suggested value.

In other aspects, functions described above as being performed by the server may be performed by the client device, and vice versa. For example, listing screen display 500 may be displayed on a server instead of being transmitted to a client.

It will be further understood that the sample values, types and configurations of data shown in the figures are for the purposes of illustration only. In that regard, systems and methods in accordance with aspects of the invention may include different data values, types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for detecting trends in clustered business listings, the method comprising:

determining, using a processor, a last date that a last attribute value of a business listing has changed;

determining, using a processor, whether a number of data providers supplying the last attribute value has decreased by at least a first predetermined percentage since the last date the last attribute value changed;

determining, using a processor, whether a number of data providers that have stopped supplying the last attribute value since the last date the attribute value changed is greater than a number of data providers that have begun supplying the last attribute value after the last date the last attribute value changed;

determining, using a processor, whether a number of data providers supplying a new attribute value increases by a second predetermined percentage since the last date the last attribute value changed; and determining, using a processor, whether a third predetermined percentage of the number of data providers that have stopped supplying the last attribute value since the last date the attribute value changed have begun supplying the new attribute value since the last date the last attribute value has changed.

2. The method of claim 1, wherein the new attribute value is of a same type as the last attribute value.

3. The method of claim 1, further comprising rendering on an electronic display, using a processor, an indication that the last attribute value is trending toward the new attribute value.

4. The method of claim 1, wherein the first predetermined percentage is approximately twenty five percent.

5. The method of claim 1, wherein the second predetermined percentage is approximately ten percent.

6. The method of claim 1, wherein the third predetermined percentage is approximately fifty percent.

7. The method of claim 1, wherein a sum of data providers supplying the last attribute value is greater than a sum of data providers supplying any other attribute value of a same type.

8. The method of claim 1, wherein a weighted sum of data providers supplying the last attribute value is greater than a weighted sum of data providers supplying any other attribute value of a same type.

9. A system for detecting trends in clustered business listings, the system comprising:
   a processor;
   a listings manager module containing instructions to be executed by the processor;
   a display device for displaying data processed by the processor in accordance with the instructions of the listings manager module; and
   a memory for storing data accessed by the processor;
   wherein the listings manager module instructs the processor:
   to determine a last date that a last attribute value of a business listing has changed;
   to determine whether a number of data providers supplying the last attribute value has decreased by at least a first predetermined percentage since the last date the last attribute value changed;
   to determine whether a number of data providers that have stopped supplying the last attribute value since the last date the last attribute value changed is greater than a number of data providers that have begun supplying the last attribute value after the last date the attribute value changed;
   to determine whether a number of data providers supplying a new attribute value increases by a second predetermined percentage since the last date the last attribute value changed; and
   to determine whether a third predetermined percentage of the number of data providers that have stopped supplying the last attribute value since the last date the attribute value changed have begun supplying the new attribute value since the last date the last attribute value has changed.

10. The system of claim 9, wherein the new attribute value is of a same type as the last attribute value.

11. The system of claim 9, further comprising rendering on an electronic display an indication that the last attribute value is trending toward the new attribute value.

12. The system of claim 9, wherein the first predetermined percentage is approximately twenty five percent.

13. The system of claim 9, wherein the second predetermined percentage is approximately ten percent.

14. The system of claim 9, wherein the third predetermined percentage is approximately fifty percent.

15. The system of claim 9, wherein a sum of data providers supplying the last attribute value is greater than a sum of data providers supplying any other attribute value of a same type.

16. The system of claim 9, wherein a weighted sum of data providers supplying the last attribute value is greater than a weighted sum of data providers supplying any other attribute value of a same type.

* * * * *